United States Patent [19]

Spainhour

[11] 4,401,267

[45] Aug. 30, 1983

[54] TORCH

[75] Inventor: Carroll D. Spainhour, Princeton Township, Mercer County, N.J.

[73] Assignee: Western Electric Company, Inc., New York, N.Y.

[21] Appl. No.: 300,356

[22] Filed: Sep. 8, 1981

[51] Int. Cl.³ .............................................. B05B 15/00
[52] U.S. Cl. .................................. 239/132.3; 239/423; 239/555; 239/552
[58] Field of Search ...................... 239/132.3, 418, 423, 239/429, 430, 433, 543, 555, 552

[56] References Cited

U.S. PATENT DOCUMENTS

| | | |
|---|---|---|
| 1,211,792 | 1/1917 | Von Boden .......................... 239/423 |
| 2,719,581 | 10/1955 | Greathead ........................ 239/132.3 |
| 3,556,401 | 1/1971 | Hughes ........................... 239/429 X |
| 3,610,794 | 10/1971 | Adamski ............................. 431/354 |
| 3,843,057 | 10/1974 | Geiszler ........................... 239/132.3 |
| 4,217,027 | 8/1980 | MacChesney et al. | |
| 4,231,777 | 11/1980 | Lynch et al. | |

FOREIGN PATENT DOCUMENTS 469350  11/1950  Canada ............................... 239/132

Primary Examiner—John J. Love
Attorney, Agent, or Firm—D. J. Kirk

[57] ABSTRACT

This disclosure is directed to an oxy-hydrogen torch (10) comprised of a nozzle plate (16) captured between first and second outer members (12 and 14). Each outer member has a plenum (18) which open towards, and is separated by, the plate (16). The nozzle plate (16) has a plurality of spaced grooves (32—32) in one major surface (34) which are arranged in an interleaved relationship with the spaced grooves (36—36) on the opposite surface (38). The grooves (32 and 36) extend from an edge of the plate (16) to the respective plenums (18—18) in the outer members (12 and 14). Oxygen is directed into one plenum (18) and hydrogen urged into the other plenum. The gases pass through the respective grooves (32 and 36) to the surface (46) of the torch (10) for surface mixing and ignition.

5 Claims, 6 Drawing Figures

TORCH

TECHNICAL FIELD

This invention is directed to a torch used to heat articles.

BACKGROUND OF THE INVENTION

One technique that is well known for fabricating preforms from which lightguide fibers are drawn is known as the Modified Chemical Vapor Deposition (MCVD) process and is described in U.S. Pat. No. 4,217,027 which issued on Aug. 12, 1980 and is hereby incorporated by reference. Lightguide preform fabrication starts with a chemically cleaned tube of fused quartz which is rotated in a glass working lathe. A surface mixing oxy-hydrogen torch repeatedly moves along the length of the tube in one direction resulting in a hot zone (approximately 1400° to 1800° C.) moving therealong. Chemical vapors are directed into the rotating tube as the torch traverses its length, resulting in the deposition of uniform core layers of fused doped silica on the inside of the tube.

Multiple layers are deposited in this fashion to produce the desired tube-to-core mass ratio and a desired refractive index profile. Anywhere from 50 to 100 traversals of the torch are made, and the amount of dopant used on each pass may be varied, increasing the refractive index in each successive deposited layer to fabricate a graded index preform or the dopant level may be maintained constant in each layer to form a step index preform. The tube, with the deposited layers therein, is then collapsed into a solid rod preform by elevating the temperature of the torch to approximately 2,000° C. as it moves along the length of the tube in several passes.

One type of torch used in the above fabrication process, for both deposition and collapse, is comprised of a multitude of small diameter hollow tubes having their first ends forming an arcuate array and their second ends communicating with a supply of gas, as shown in U.S. Pat. No. 4,231,777 which is assigned to the instant assignee. Oxygen exits through the tube ends while hydrogen passes through the gaps between the tubes. This torch has been found to be most effective in fabricating lightguide preforms. However, such a torch is expensive to manufacture and troublesome to repair. Additionally, it is difficult to control the velocity of the gases emanating from the torch due to variations in the diameters of the tubes.

Accordingly, there is a need for a relatively inexpensive torch which can be easily assembled or disassembled to repair. Additionally, the torch should provide uniform gas velocities.

SUMMARY OF THE INVENTION

The instant invention overcomes the foregoing problems with a torch comprised of a plate captured between first and second outer members, each outer member having a cavity therein which opens toward the plate. The plate has at least one groove on each major surface thereof extending from an edge thereof to the respective cavities in the outer members. Gases directed into the cavities exit through the respective grooves.

Advantageously, the instant torch is less expensive to fabricate than prior art designs.

A further advantage is that the instant torch may be easily and quickly repaired.

Additionally, the grooves in the plate may be machined to close tolerances resulting in uniform gas velocity therefrom.

DETAILED DESCRIPTION

The instant torch is described in relation to its use for heating glass tubes as material is deposited on the inside surface thereof and to provide elevated temperatures to collapse such tubes. However, such description is for purposes of exposition and not for limitation for the instant torch may be advantageously used to heat other articles having various geometries.

Figure 1:
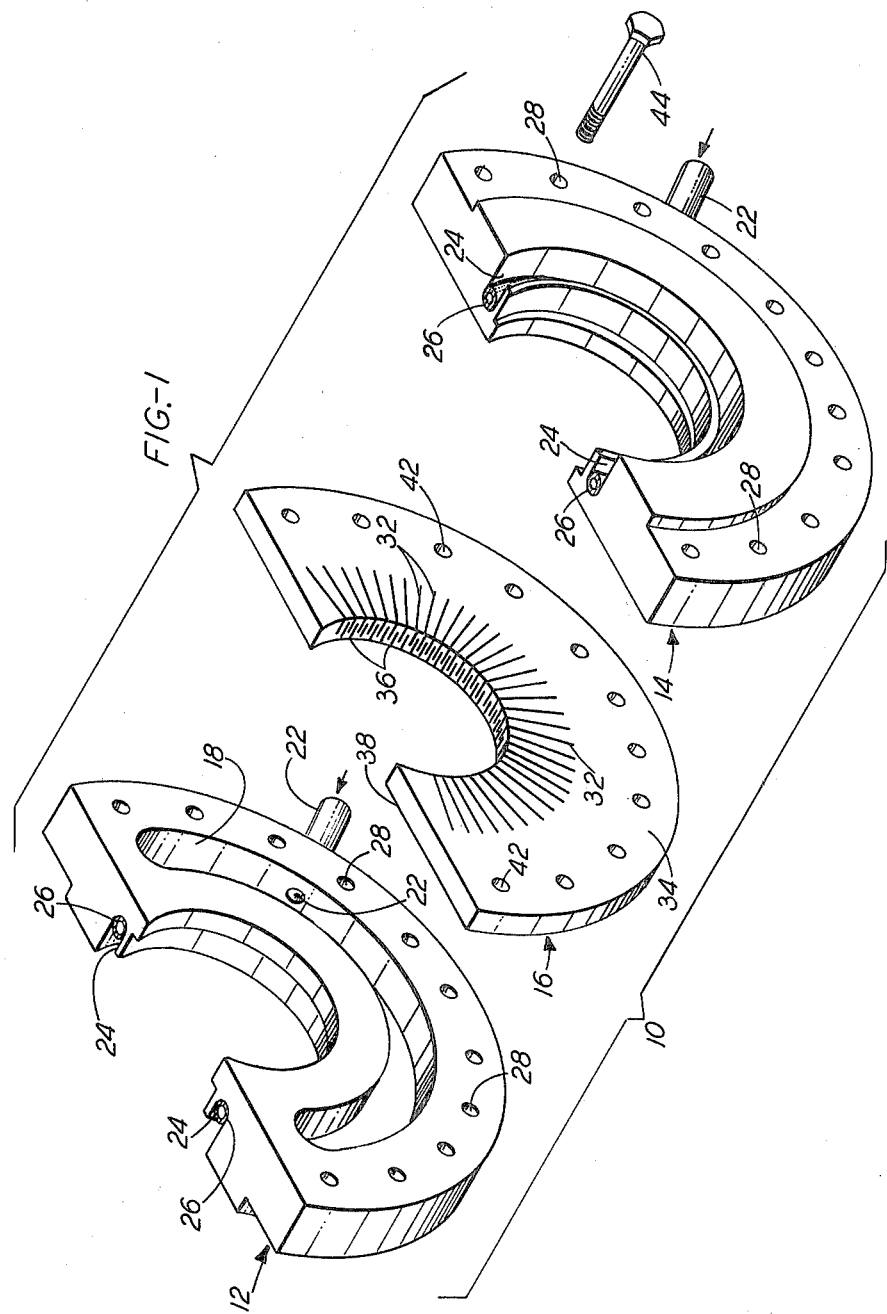
FIG. 1 is an exploded view of the instant torch.

The torch generally referred to by the numeral 10 in the exploded view shown in FIG. 1 is comprised of first and second identical outer members 12 and 14, respectively, and a nozzle plate 16, all having coextensive arcuate surfaces. The outer members 12 and 14 each have a "U" shaped plenum 18 and an input conduit 22 communicating therewith. The first and second outer members 12 and 14 each have an arcuate channel 24 having a cooling tube 26 pressed therein. A plurality of holes 28—28 pass through both members 12 and 14.

Figure 3:
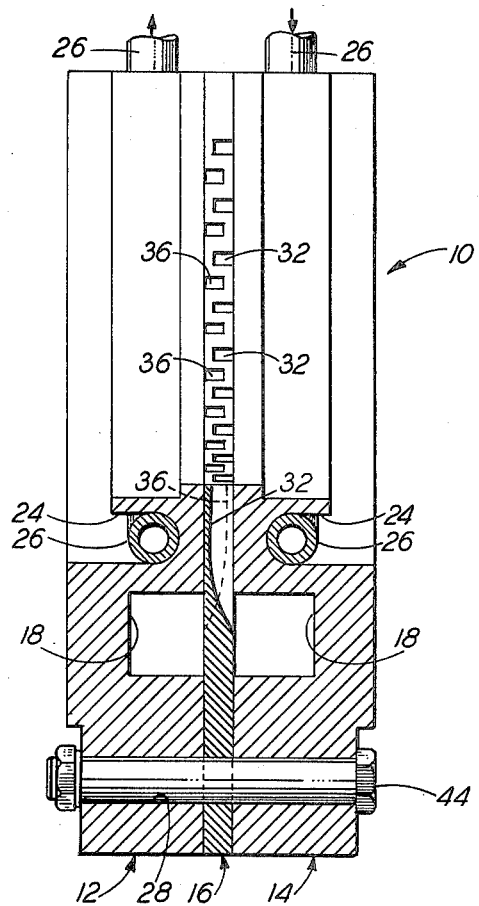
FIG. 3 is a cross-sectional view of the instant torch.

The nozzle plate 16 has a first plurality of radially disposed grooves 32—32 machined in a first major surface 34 and, as best seen in FIG. 3, a second plurality of radially disposed grooved 36—36 machined in a second major surface 38. The plate 16 has a plurality of holes 42—42 therethrough.

Figure 2:
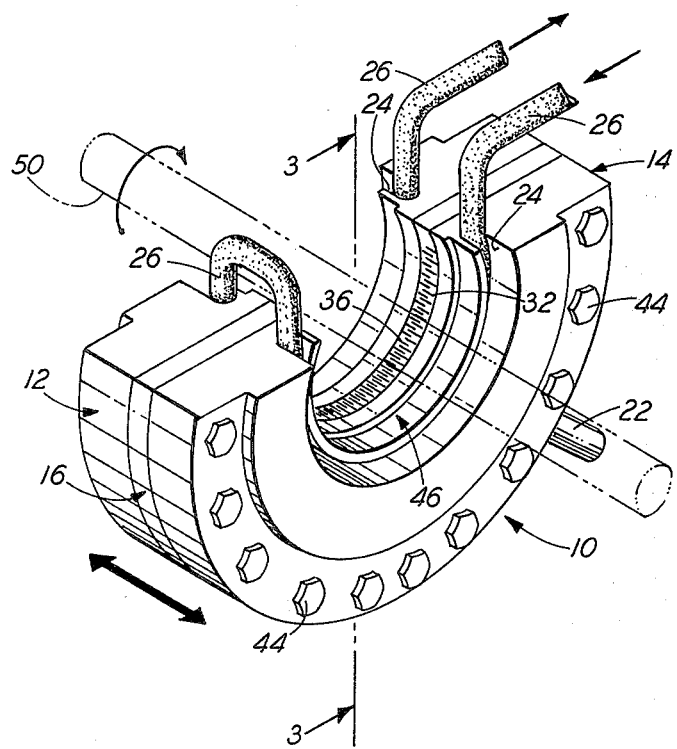
FIG. 2 shows the torch assembled and in position to heat a glass tube.

FIG. 2 is an isometric view of the torch 10 which is assembled by capturing the planar nozzle plate 16 between the outer members 12 and 14 and securing the component parts together with a plurality of bolts 44—44 which pass through the holes 28 and 42.

FIG. 3 is a cross sectional view of the torch 10 taken along 3—3 as shown in FIG. 2. It can be clearly seen that the planar nozzle plate 16 separates the two plenums 18—18 and that the radial length of the grooves 32 and 36 is sufficient to communicate from the arcuate outer surface 46 (see FIG. 2) of the torch 10 to the plenums 18—18 of members 12 and 14, respectively.

Figure 4:
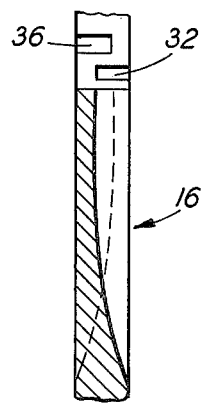
FIGS. 4 to 6 depict several alternative arrangements of grooves in the planar plate of the instant torch.
Figure 5:
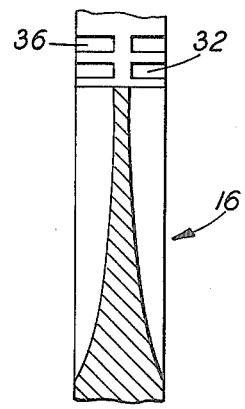
Figure 6:
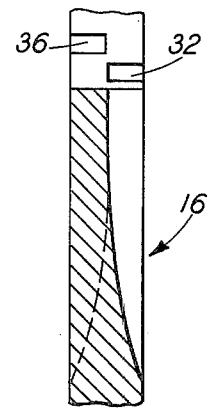

Although, in a particular embodiment the grooves 32 and 36 are interleaved as shown in FIG. 4, other arrangements such as aligned grooves (FIG. 5) or offset (FIG. 6) can be effectively used depending on the gases used, surface mixing required, desired temperature, etc.

In a particular exemplary embodiment depicted in FIG. 2, the outer members 12 and 14 as well as the plate 16 were made of aluminum and the tubing 26 was made of stainless steel.

In operation, oxygen is directed into the plenum 18 of the outer member 12 via the conduit 22 while hydrogen is urged into the plenum 18 of the outer member 14 via conduit 22. The oxygen and hydrogen gases will pass from the plenums 18—18 and exit through the grooves 32 and 36, respectively, as alternating jets (see FIGS. 3 and 4). The gases will mix at the surface of the torch 10 and are ignited to form an arcuate flame. A rotating glass tube 50, shown in phantom in FIG. 2, is then positioned within the flame and the torch 10 repeatedly moved along the length thereof to provide sufficient heat to fabricate a lightguide preform as described in detail in U.S. Pat. No. 4,217,027. A coolant, such as water, is passed through the tube 26, as indicated by the arrows, to maintain the temperature of the arcuate surface 46 low enough to prevent oxides from forming on the surface thereof to prevent subsequent ejection of particulate which can contaminate the surface of the preform during fabrication. Such particulate can adversely affect the strength of a fiber drawn therefrom. Although, the instant embodiment makes use of a coolant tube 26, various other techniques, such as internal cooling channels, may be used.

The instant torch 10 is at least as efficient and is less expensive to fabricate than prior art torches. Additionally, the torch 10 may be repaired simply by replacing any of the three basic components (i.e., the outer members 12 and 14 and the nozzle plate 16). Furthermore, the heat zone and flame pressure areas provided by the instant torch 10 may be modified by simply changing the size of the grooves 32 and 36 and/or the thickness of the nozzle plate 16.

In four exemplary embodiments, the dimensions of the grooves 32 and 36 in a 0.125 inch thick nozzle plate 16, are shown in Table I.

TABLE I

| TORCH | $O_2$ Groove Width | $O_2$ Groove Area (in$^2$) | $H_2$ Groove Width (in) | $H_2$ Groove Area (in$^2$) |
|---|---|---|---|---|
| 1 | .010 | .043 | .020 | .085 |
| 2 | .012 | .051 | .025 | .109 |
| 3 | .020 | .085 | .040 | .175 |
| 4 | .025 | .106 | .051 | .233 |

Although the exemplary torch uses an oxygen-hydrogen mixture, other gas combinations such as methane, propane or the like can be used.

It is to be understood that the embodiments described herein are merely illustrative of the principles of the invention. Various modifications may be made thereto by persons skilled in the art which will embody the principles of the invention and fall within the spirit and scope thereof. For instance, the torch 10 is arranged to provide an arcuate surface of approximately 180°, however the arc can be less than or greater than 180° and may be 360° forming an annulus through which a tube 50 may pass. Additionally, although the torch 10 has an arcuate surface 46 in order to accommodate a substantially cylindrical article (i.e., a glass tube 50) it is not so limited. For the surface 46 may be planar or take on other configurations depending on the geometry of the article to be heated.

What is claimed is:

1. A torch comprising:
    a plate;
    first and second outer members arranged such that the plate is captured therebetween;
    each outer member having a cavity therein which opens toward the plate which isolates said cavities;
    inlet means for directing gas into each cavity; and
    the plate having a plurality of grooves on each major surface thereof, arranged in an interleaved relationship, the grooves extending from the respective cavities in the outer members to an outer edge of the plate to form a plurality of gas outlets.

2. The torch as set forth in claim 1, which further comprises:
    cooling means located proximate the outer edge of the plate.

3. The torch as set forth in claim 1, wherein:
    the outer edge of the plate is arcuate in shape; and
    the grooves are radially disposed therein.

4. The torch as set forth in claims 1, 2 or 3, comprising:
    a channel in each of said outer members for communicating between the respective cavities and a source of gas.

5. A torch comprising:
    a plate;
    first and second outer members separated by the plate fixedly mounted therebetween, said plate and outer members having at least one coextensive arcuate surface;
    said first and second outer members having respective plenums therein, each plenum having means for communicating with a different gas source; and
    said plate having a plurality of radially spaced grooves on each major surface thereof, which grooves are arranged in an interleaved relationship, and which extends from the respective plenums to the arcuate surface of said plate to form a plurality of gas outlets.

* * * * *